United States Patent [19]

Bodine et al.

[11] Patent Number: 4,770,389

[45] Date of Patent: Sep. 13, 1988

[54] ELECTRIC VALVE DEVICE

[75] Inventors: James A. Bodine, Walnut Creek; Judson S. Kuehn, San Rafael; William H. Silcox, San Francisco, all of Calif.

[73] Assignee: Chevron Research Company, San Francisco, Calif.

[21] Appl. No.: 863,206

[22] Filed: May 14, 1986

[51] Int. Cl.[4] .............................................. F16K 31/06
[52] U.S. Cl. .................................. 251/129.1; 251/65; 251/129.04
[58] Field of Search .................... 251/65, 129.1, 129.04

[56] References Cited

U.S. PATENT DOCUMENTS

| | | | |
|---|---|---|---|
| 1,475,129 | 11/1923 | Mayer | 251/129.1 |
| 3,203,447 | 8/1965 | Bremner et al. | 251/65 X |
| 3,332,045 | 7/1967 | Rodaway | 251/65 X |
| 3,368,788 | 2/1968 | Padula | 251/65 |
| 3,379,214 | 4/1968 | Weinberg | 251/65 |
| 4,065,096 | 12/1977 | Frantz et al. | 251/129.1 |

Primary Examiner—Arnold Rosenthal
Attorney, Agent, or Firm—S. R. Lapaglia; E. J. Keeling; V. A. Norviel

[57] ABSTRACT

The present invention relates to an electric valve device used in subsea applications. It comprises a valve body with a centrally placed slidable valve core. The core has an aperture for fluid passage and may be held in position by 2 permanent magnets in the valve body. Windings are placed in the valve body so that they encircle the slidable core. To move the core, a DC current source is attached to the windings so that when they are energized a force is generated to move the core in a specific direction. The core is then held in this position by the contact between the magnets in the valve body and the valve core until the polarity of the windings is switched and the valve is moved in the opposite direction.

6 Claims, 1 Drawing Sheet

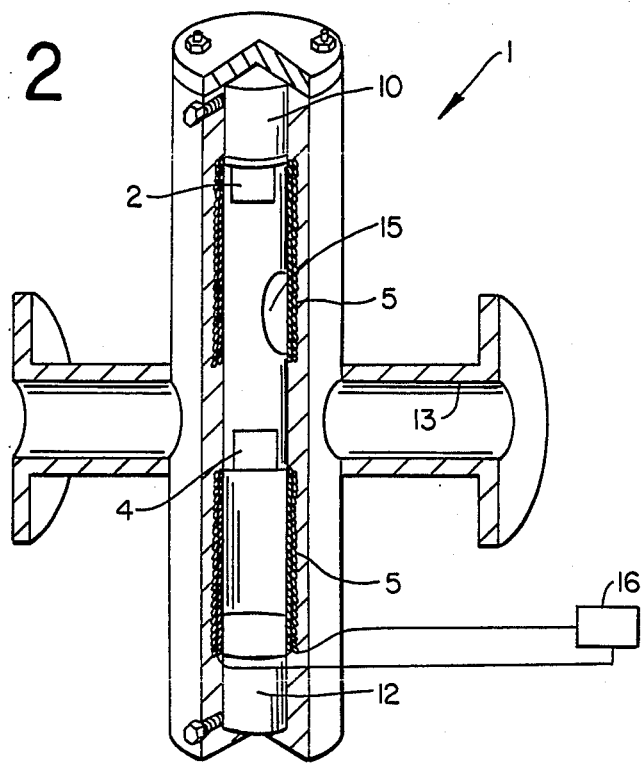
FIG _ 2
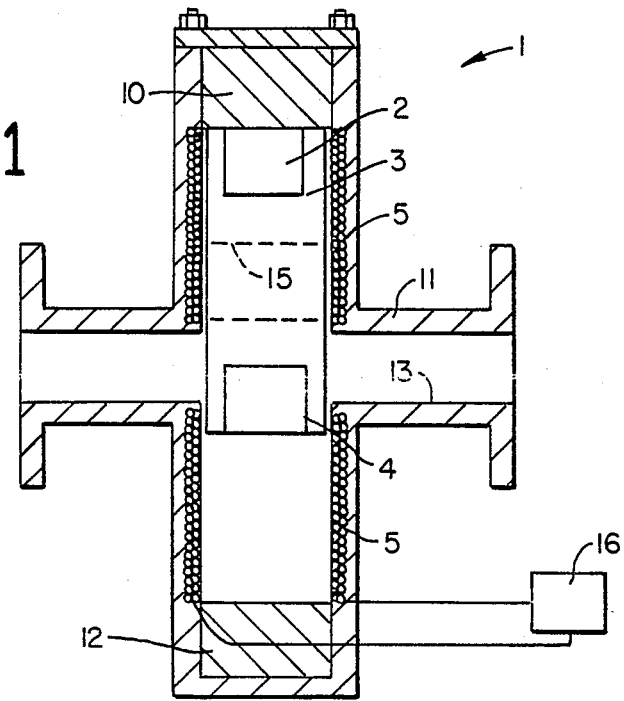
FIG _ 1

ELECTRIC VALVE DEVICE

FIELD OF THE INVENTION

This device relates to electrically actuated flow control devices. More specifically, to electromagnetic valves for use in subsea operations.

BACKGROUND OF THE INVENTION

In oil drilling and producing operations, there exists a need for subsea valves they can be actuated from a remote location. Currently, subsea valves are employed that use hydraulic, manual, or electric controls, but these do not work perfectly for a variety of reasons. For example, hydraulic controls, when operated from a position above the water surface, require long hydraulic control lines which may rupture or suffer delays in actuation. Manually operated valves are likewise imperfect for obvious reasons, such as the need for divers or remotely operated vehicles, slow response time, possibly hazardous depths and water conditions, etc. Electric valves that are currently employed in subsea uses are small pilot valves that operated control systems rather than the main flowline. Once the electrically operated pilot valve is triggered, it, in turn, actuates a larger hydraulic valve to control the primary flowline. Since these pilot valves are small, capable of handling only a low fluid volume, and cannot be scaled up to a larger size (as the designs are not linear), they cannot be used in the primary system. Other objections to electric valves, in general, are than: some require continuous power in each valve position and therefore more energy, they may have components that are susceptible to wear which requires more frequent maintenance, they may be too large and complex, or the time response for actuation may be too slow. Consequently, many of these designs are not feasible for subsea applications.

Examples of electromagnetic valves that use windings and/or polarity reversing means are : Gast et al., U.S. Pat. No. 4,392,632; Lynes et al., U.S. Pat. No. 3,484,074; Kawata et al., U.S. Pat. No. 4,350,319; Hashimoto, U.S. Pat. No. 4,286,767; and Inada et al., U.S. Pat. No. 4,346,736. Magnetically actuated pilot valves are illustrated by: Kah, U.S. Pat. Nos. 4,349,045 and 4,320,023, and Raymond, U.S. Pat. No. 4,053,137.

For these reasons, it is an object of this invention to provide a remotely actuable primary valve for use in the main flowline that is efficient, highly reliable, and preferably simple. It is a further object of this invention to reduce the subsea valve operator size, increase the response time, and eliminate the need for costly umbilicals.

SUMMARY OF THE INVENTION

Generally speaking, the present invention relates to a main flowline electromagnetic valve for subsea applications. It comprises a slidable core placed within a valve body. This slidable core has an aperture for fluid passage and is made of a ferrous or other magnetic material. The valve body has permanent magnets placed at each end of the body that face the slidable core. The magnets in the valve body serve to retain the core in either an open or a closed position once the core has been moved one way or the other. Windings are placed within the valve body closer to the center of the valve than the magnets in the valve body and are wound so that they encircle the slidable core. Energizing these windings with a DC source of correct polarity will then cause the core member to move in a specific direction and the valve will either open or close. This movement is determined by reversing the polarity of the windings, which may be accomplished by either changing their polarity by an outside source or winding one set of the windings in the valve body in reverse direction in relation to the other set of windings and energizing them one at a time.

BRIEF DESCRIPTION OF THE DRAWINGS

FIG. 1 is a sectional view illustrating the preferred embodiment of the invention; and FIG. 2 is a perspective view with portions broken away for clarity in presentation also illustrating the preferred embodiment of the invention.

DETAILED DESCRIPTION OF THE INVENTION

FIG. 1 represents cross-sectional side view of an electromechanical valve 1 in the closed position having a slidable core member 3 fit within a valve body 11. The lengthwise cross section (FIG. 1) of core 3 is generally a rectangle, but the widthwise cross section (see FIG. 2) may be essentially anything from a circle to a rectangle. Core 3 has a centrally located aperture 15 perpendicular to its lengthwise axis which provides for fluid flow through valve 1 upon communication with a valve body aperture 13. Core 3 is made of ferrous or magnetic material. The valve body 11 has an upper 10 and a lower magnet 12. Valve body 11 has windings 5 placed in the inside of valve body 11 around core 3. These windings 5 are placed between valve body aperture 13 and the magnets in valve body 11.

Valve 1 is operated in the following manner: to open or close valve 1 a sufficient amount of DC current (AC current could be used if certain design changes were made) is used to energize windings 5, which forces the core 3 either up or down depending on the DC polarity. Here, the core is attracted in one direction and repelled in the other. For example, if core 3 is in the closed position (FIG. 1) and the windings 5 in the upper end of the valve body 11 are energized, core 3 is forced into the open position by overcoming both the seal friction and the magnetic attraction between the upper core and the upper valve body magnet 10. When valve 1 is open, the lower core is in communication with the lower valve body magnet 12 and to move the core 3 from this position it is necessary to change the polarity of the energizing current and then reenergize the windings 5. The polarity may be controlled by providing a polarity reversing means 16 exterior to valve 1 or by wrapping windings 5 in reverse direction relative to one another. Once the windings are energized and core 3 has been moved, it comes in close proximity with the valve magnets 10 and 12. It is the magnetic attraction between the valve body magnets 10 and 12 and the core 3 that holds the core 3 in position until the windings 5 are reenergized with enough current of reverse polarity to overcome this attraction plus the seal friction. (An alternate embodiment could also use magnets 2 and 4 in the slidable core to hold the core in position.)

To determine the amount of force that is required to move the core and overcome the attraction between the core and valve body magnets plus the seal friction in the bore, we may use this equation:

$$F = (A\mu_o N^2 I^2)/(2x^2 \text{ gap}) \text{ (as expressed in Newtons)}$$

where A is the cross section of the gate area in meters squared, $\mu_o$ is the permeability of free space in Henrys/m, N is the number of turns in the windings, I is the current in amperes, and x gap is the distance of travel of the core in meters. After some general assumptions in valve size are made, each variable may be ascertained.

There are essentially two positions in which core 3 may be placed: open, where the core aperture 15 is placed in communication with valve aperture 13; and closed, where core aperture 15 is moved and valve aperture 13 is blocked by the body of core 3. Whatever the position valve core 3 is in, that is the position it will remain until windings 5 are reenergized because power is only used when the core needs to be moved. As such, this is defined as a fail-in position valve. In the event that direct power to valve 1 is lost, valve 1 may potentially cause a problem by remaining in the permanently open position. However, this may be circumvented to achieve a fail-safe close capability using some form of local battery storage to power the valve 1 closed. The type of power loss or switch-over system, now used for emergency lighting, is illustrative of this concept.

Once a subsea tree has these electric valves in place of current hydraulically operated valves, the control cables could be reduced to a single electrical control line with power conductors and a control system. The control line would run from a platform with a control desk to a control pod on the subsea wellhead. The control pod would contain relays or other switching devices to apply DC power to any control wire or any valve. This switching control system would have to allow for applying either polarity to the control wire leads. The control signals could be transmitted over the control line using a MUX (multiplexer) system. However, a potential future embodiment could produce power locally in the subsea environment. Control lines could be eliminated, and the control signals transmitted either acoustically through the seawater or electrically through the control lines or any other means of signal transmission.

Since many modifications and variations of the present invention are possible within the spirit of this disclosure, it is intended that the embodiments disclosed are only illustrative are not restrictive. For that reason, reference is made to the following claims rather than to the specific description to indicate the scope of this invention.

What is claimed is:

1. A valve for use with subsea production trees and capable of being remotely operated comprising:
    (a) an elongated valve body having a central opening formed along the longitudinal central axis thereof;
    (b) a pair of side ports in communication with said central opening spaced apart on said valve body;
    (c) a ferromagnetic plug member slidably positioned in said central opening in a closely spaced relationship with the interior of said valve body, said plug member being longitudinally movable between at least a first position and a second position;
    (d) a passageway for fluid flow through said plug member formed transverse to the longitudinal axis of said plug member, the passageway adapted to align with the said pair of side ports when said plug member is in said second position to permit fluid flow through said valve body via said side ports and to be out of alignment with the side ports when said plug member is in said first position to prevent fluid flow through said valve body via said side ports;
    (e) retaining magnets located in said central opening to hold said ferromagnetic plug in a first or second position;
    (f) a first and a second primary coil means located in the interior of said valve body adjacent to said central opening and operably positioned to override said retaining magnets when excited to move said plug member to said second position to permit fluid flow through said valve body, said first and second coil means would in an opposite direction;
    (g) means for selectively exciting said primary coil means;
    (h) means connected to the ends of said valve body for closing off both ends of said central opening; and
    (i) conduit means connected to said valve body adjacent to each of said side ports for receiving fluid flow through said valve body, said conduit means adapted to be operably connected with a subsea production tree.

2. The apparatus as recited in claim 1 wherein the means for selectively exciting said primary coil means has a means for reversing the polarity of said primary coil means.

3. The apparatus as recited in claim 1 where an emergency shut off means is provided to shut the valve off in the event that power to the valve is lost during operating of the valve.

4. The apparatus as recited in claim 1 where magnets are placed in the termini of the ferromagnetic plug, the magnets have reverse polarity from the retention magnets so that the ferromagnetic plug will be held in a first or a second position.

5. A valve for use wtih subsea production trees and capable of being remotely operated comprising:
    (a) an elongated valve body having a central opening formed along the longitudinal central axis thereof;
    (b) a pair of side ports in communication with said central opening spaced apart on said valve body;
    (c) a ferromagnetic plug member slidably positioned in said central opening in a closely spaced relationship with the interior of said valve body, said plug member being longitudinally movable between at least a first position and a second position;
    (d) a passageway for fluid flow through said plug member formed transverse to the longitudinal axis of said plug member, the passageway adapted to align with the said pair of side ports when said plug member is in said second position to permit fluid flow through said valve body via said side ports and to be out of alignment with the side ports when said plug member is in said first position to prevent fluid flow through said valve body via said side ports;
    (e) a pair of plug magnets located in the termini of the ferromagnetic plug;
    (f) retaining magnets located in said central opening opposite said plug magnets to hold said ferromagnetic plug in a first or a second position;
    (g) primary coil means located in the interior of said valve body adjacent to said central opening and operably positioned to override said retaining magnets when excited to move said plug member;
    (h) means for selectively exciting said primary coil means;

(i) means for reversing the polarity of said means for selectively exciting said primary coil means;

(j) means connected to the ends of said valve body for closing off both ends of said central opening; and (k) conduit means connected to said valve body adjacent to each of said side ports for receiving fluid flow through said valve body, said conduit means adapted to be operably connected with a subsea production tree.

6. A valve for use with subsea production trees and capable of being remotely operated comprising:

(a) an elongated valve body having a central opening formed along the longitudinal central axis thereof;

(b) a pair of side ports in communication with said central opening spaced apart on said value body;

(c) a ferromagnetic plug member slidably positioned in said central opening in a closely spaced relationship with the interior of said valve body, said plug member being longitudinally movable between at least a first position and a second position;

(d) a passageway for fluid flow through said plug member formed transverse to the longitudinal axis of said plug member, the passageway adapted to align with the said pair of side ports when said plug member is in said second position to permit fluid flow through said valve body via said side ports and to be out of alignment with the side ports when said plug member is in said first position to prevent fluid flow through said valve body via said side ports;

(e) retaining magnets located in said central opening to hold said ferromagnetic plug in a first or a second position;

(f) primary coil means located in the interior of said valve body adjacent to said central opening and operably positioned to override said retaining magnets when excited to move said plug member to said second position to permit fluid flow through said valve body;

(g) means for selectively exciting said primary coil means;

(h) means connected to the ends of said valve body for closing off both ends of said central opening;

(i) conduit means connected to said valve body adjacent to each of said side ports for receiving fluid flow through said valve body, said conduit means adapted to be operably connected with a subsea production tree; and (j) plug magnets placed in the termini of the ferromagnetic plug, said plug magnets having reverse polarity from the retention magnets whereby the ferromagnetic plug can be held in a first or a second position.

* * * * *